United States Patent [19]

Eden

[11] 4,183,114
[45] Jan. 15, 1980

[54] REAR WINDOW WIPER MECHANISM FOR A MOTOR VEHICLE

[75] Inventor: Stephen J. R. Eden, Whittleford, England

[73] Assignee: Chrysler United Kingdom Ltd., London, United Kingdom

[21] Appl. No.: 870,798

[22] Filed: Jan. 19, 1978

[30] Foreign Application Priority Data

Jan. 31, 1977 [GB] United Kingdom ............... 03905/77

[51] Int. Cl.² ................................................ B60S 1/02
[52] U.S. Cl. ................................. 15/250.25; 296/84 A
[58] Field of Search ............ 15/250.25, 250.24, 250.3; 296/84 A

[56] References Cited

U.S. PATENT DOCUMENTS

| | | | |
|---|---|---|---|
| 2,355,860 | 8/1944 | Hansen | 15/250.3 |
| 2,568,922 | 9/1951 | Malone | 15/250.25 |
| 2,580,577 | 1/1952 | Nally | 15/250.3 |
| 2,604,652 | 7/1952 | Poindexter | 15/250.32 |
| 3,670,353 | 6/1972 | Gute et al. | 15/250.10 |
| 3,999,241 | 12/1976 | Mafnas | 15/250.30 |

*Primary Examiner*—Richard A. Bertsch
*Attorney, Agent, or Firm*—Mawhinney & Mawhinney & Connors

[57] ABSTRACT

A window wiper mechanism for an opening rear window of a motor vehicle comprises a motor unit mounted on a fixed part of a vehicle body a flexible output drive extending to a guide adjacent the window and then along the inner side of the window adjacent and parallel to the hinge axis of the window to a drive unit mounted on the inner side of the window. The drive unit has an output shaft extending through the window to which a window wiper is connected.

8 Claims, 5 Drawing Figures

REAR WINDOW WIPER MECHANISM FOR A MOTOR VEHICLE

BACKGROUND OF THE INVENTION

1. Field of the Invention

The invention relates to a rear window wiper mechanism for a motor vehicle having an opening rear window.

2. Description of the Prior Art

Motor vehicles which have rear opening tail-gates, that is a rear door usually pivoted at its upper end and incorporating a rear window, are commonly provided with a wiper mechanism for the rear window. Such mechanisms usually comprise a drive motor mounted within the door structure adjacent the window with a drive shaft projecting from the outer side of the structure and a wiper secured to the shaft to sweep over the window. Such arrangements are not, however, practical for a rear opening window which has no encircling frame or only a nominal peripheral frame. In such cases the whole of the wiper mechanism including the motor has been mounted on the window but this is un-attractive, adds weight and therefore stress to the window and obscures vision through a considerable portion of the window. The mechanism has also been mounted on the bodywork below the window such that the wiper arm and blade assembly is parked off the window but here it is vulnerable to inadvertent damage particularly when loading the vehicle through the open rear window.

The object of the present invention is therefore to provide a wiper mechanism for an opening rear window which avoids the above defects.

SUMMARY OF THE INVENTION

The invention provides a vehicle body having an opening rear window hinged along one edge for opening movement of the body, a window wiper drive unit mounted on the inner side of the window adjacent said one edge partway along the edge, the drive unit having an output shaft extending through an opening in the window with the shaft axis normal to the plane of the window, a wiper secured to the shaft on the outer side of the window, a motor unit for the wiper drive unit mounted on the inner side of the vehicle body, a flexible drive transmission extending from the motor unit to the drive unit and means to guide the transmission along the inner side of the window parallel to said edge to the wiper drive unit so that the transmission can accommodate opening and closing of the window by flexing.

DESCRIPTION OF THE PREFERRED EMBODIMENT

Figure 1:
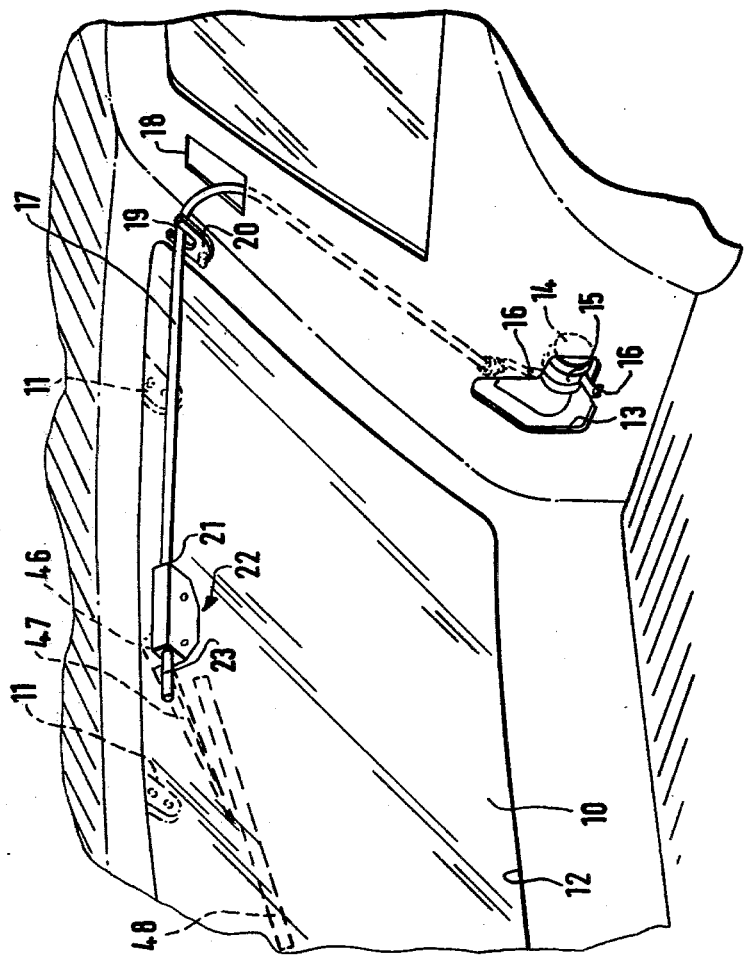
FIG. 1 is a perspective rear side view of part of a vehicle interior showing a rear window wiper arrangement according to the invention.
Figure 2:
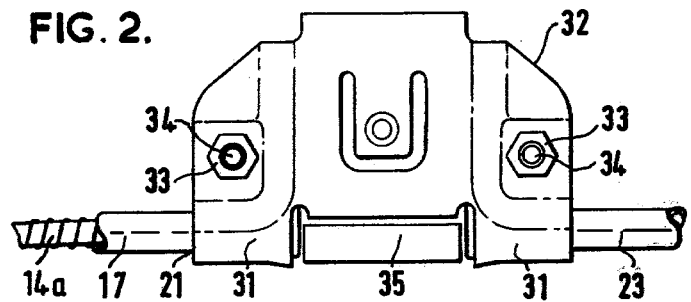
FIGS. 2, 3 and 4 are plan and elevation views of part of the arrangement shown in FIG. 1.
Figure 3:
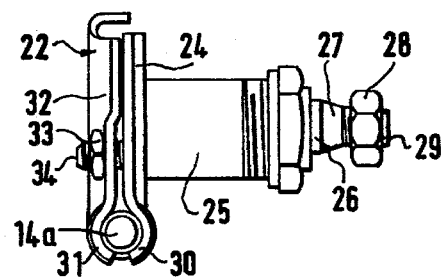
Figure 4:
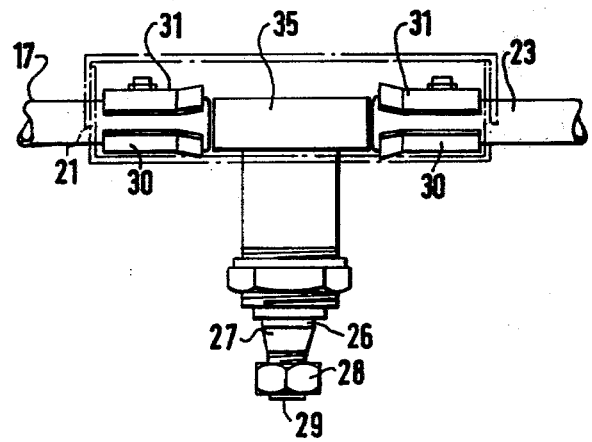
Figure 5:
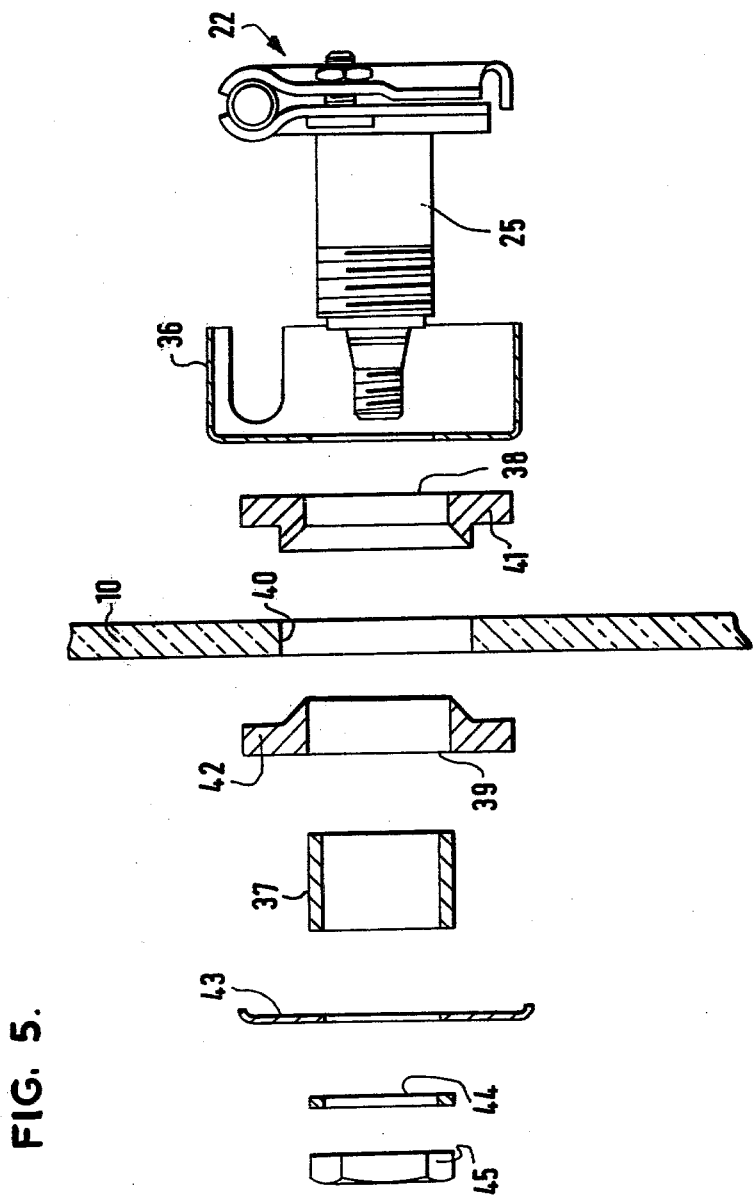
FIG. 5 is an "exploded" view of part of the arrangement shown in FIG. 1.

Referring to the drawings, there is shown in FIG. 1 a rear part of a motor vehicle having an openable rear window 10. The window has two hinges 11 spaced apart along the upper marginal edge thereof, the two elements of each hinge being attached to the glass pane and the vehicle body structure respectively to permit pivotable movement of the window about an axis extending transversely of the vehicle adjacent the upper edge of the body rear window aperture 12.

An aperture 13 in an inner panel of the vehicle body structure on one side and adjacent the rear thereof permits the insertion and location of a motor unit such as a conventional electric motor driven window wiper drive mechanism 14 within the hollow space between inner and outer body structure panels, the mounting for the drive mechanism 14 comprising a bracket 15 secured to the drive mechanism and attached to opposed marginal edges of the aperture 13 by screws 16.

One end of a flexible drive transmission comprising a rigid conduit 17 is releasably secured to the upper part of the housing of the drive mechanism 14 and extends upwardly within the hollow body side structure a distance and curved inwardly in a transverse direction to emerge from an upper structure 18 in the inner body panel and passes through guide means such as an open ended slot 19 in the top edge of a bracket 20 welded to the rear of the body structure adjacent a vertical edge of the body window aperture and comprising part of a mounting bracket for the pivotal end of a gas spring strut (not shown), the other end of which is pivotally mounted on the underside of the rear window pane. By engagement into the slot 19 the conduit at this point is free to move a limited amount in transverse and substantially vertical planes but is constrained against movement generally along the longitudinal axis of the vehicle.

From bracket 20, the conduit 17 extends inwardly towards the centre of the vehicle just below and generally parallel to the upper edge of the rear window body aperture and adjacent the inside face of the window pane but spaced from it. The end 21 of conduit 17 enters and is attached for relative rotational movement to one end of a window wiper drive unit in the form of a window wiper wheelbox assembly 22 resiliently mounted on the underside of the vehicle rear window at substantially the vertical centre and adjacent the top marginal edge thereof.

One end of a helically toothed resilient drive element 14a is reciprocated by the drive mechanism 14, the element extending through the conduit 17 and tangentially past the periphery of a toothed wheel in the wheelbox assembly into a short extension conduit 23 secured to the end of the wheel box assembly remote from conduit 17. The exposed section of the toothed drive element between adjacent ends of the conduits 17, 23 engages into the toothed wheel to provide oscillatory movement of the toothed wheel and hence the wiper arm.

Referring to FIGS. 2 to 5, the wheelbox assembly 22 comprises a plate 24 from one side of which extends a boss 25 having a through bore (not shown), the end of the boss remote from the plate being screw-threaded as shown. A toothed wheel (not shown) is located parallel to and adjacent the face of the plate opposite the boss and is fast for rotation with the end of a shaft 26 mounted for rotation in the bore of the boss 25. The other end of the shaft extends beyond the boss and is tapered and splined at 27 to receive one end of a wiper arm which is retained on the shaft by a nut 28 engaging over the screw-threaded end 29 of the shaft 26. Adjacent ends of conduits 17 and 23 are clamped between arcuately formed edge portions 30 of plate 24 and corresponding portions 31 of clamp plate 32 by tightening nuts 33 over headed studs 34 secured to plate 24 such that it permits rotational movement of the end of conduit 17 relative to the plates 24 and 32. The adjacent ends of conduits 17 and 23 are maintained spaced apart by the U-section flanged middle portion 35 of the edge of plate 24.

The wheelbox assembly is resiliently mounted adjacent the underside of the rear window as follows. The aperture in the open faced cover 36 is engaged over the boss 25 as is the spacer tube 37, the shaft and hence the spacer tube, is then inserted through the shouldered resilient annular inner and outer seals 38 and 39 which engage into hole 40 in the glass pane such that flanges 41 and 42 overlie the marginal edge of the hole 40. Outer cover plate 43 and washer 44 are then engaged over the boss 26 and the complete assembly is then pulled together by nut 45 engaging over the screw-threaded end of the boss to give a degree of resilience to the assembly determined by the length of the spacer tube 37. The end 46 of the wiper arm 47 remote from the wiper blade 48 is then secured to the end of shaft 26 as described hereinbefore.

It will be appreciated that opening the rear window 10 also causes the wheelbox assembly to rotate with the window about the transverse axis of the hinges 11. This would normally produce an undesirable degree of torsional deflection and bending in the conduit 17, these undesirable conditions are however substantially reduced by providing the freedom of movement of the conduit 17 in the required directions in slot 19 of bracket 20 together with the self-aligning properties of the resiliently mounted wheelbox assembly and the relative rotational movement between the end of conduit 17 and the wheelbox assembly 14 during which rotational movement the toothed wheel will roll around the axis of the resilient drive element without disengagement.

Apertures 13 and 18 as well as bracket 20 would normally be covered by suitable trim panels which have not been shown for reasons of clarity. One of the trim panels would incorporate a relatively small slot through which the conduit 17 would emerge.

I claim:

1. A vehicle body having an opening rear window hinged along one edge for opening movement, a window wiper drive unit mounted on the inner side of the window adjacent said one edge part-way along the edge, the drive unit having an output shaft extending through an opening in the window with the shaft axis normal to the plane of the window, a wiper secured to the shaft on the outer side of the window, a motor unit for the wiper drive unit mounted on the inner side of the vehicle body, a flexible mechanical drive transmission extending from the motor unit to the drive unit and means to guide the transmission along the inner side of the window generally parallel to said edge to the wiper unit so that the transmission can accommodate opening and closing of the window.

2. A vehicle body as claimed in claim 1 wherein the means to guide the flexible drive transmission includes a rigid tube extending from the motor unit to the wiper drive unit through which the flexible drive transmission extends, the rigid tube being rotatably connected to the wiper drive unit to permit the drive unit to turn with respect to the tube as the window is opened and closed.

3. A vehicle body as claimed in claim 2 wherein the guide means for the transmission further includes a guide member mounted on the vehicle body adjacent the window to support that part of the tube extending to the wiper drive unit generally parallel to said one edge of the window and to the window hinge axis.

4. A vehicle body as claimed in claim 3 wherein the guide means comprises an upright bracket extending generally normally to the plane of the window and having an upwardly extending slot in which the tube is located.

5. A vehicle body as claimed in claim 4 wherein the slot is open at its upper end to facilitate insertion of the tube in the slot.

6. A vehicle body as claimed in claim 4 wherein the window is hinged along its upper edge to the vehicle and the bracket is mounted on the rear wall of the vehicle to one side of the window aperture.

7. A vehicle body as claimed in claim 6 having side walls adjacent the rear walls thereof having inner and outer panels, the motor unit for the wiper being mounted between the inner and outer walls of one side of the vehicle body and the inner side wall having an aperture through which the tube extends to the guide means.

8. A vehicle body having an opening rear window hinged along one edge for opening movement, a window wiper drive unit mounted on the inner side of the window adjacent said one edge part-way along the edge, the drive unit having an output shaft extending through an opening in the window with the shaft axis normal to the plane of the window, a wiper secured to the shaft on the outer side of the window, a motor unit for the wiper drive unit mounted on the inner side of the vehicle body, a drive transmission comprising a rigid tube extending from the motor unit to the drive unit through which a flexible transmission element extends and means to guide the transmission along the inner side of the window generally parallel to said edge to the wiper unit so that the transmission can accommodate opening and closing of the window, the rigid tube being rotatably connected to the wiper drive unit to permit the drive unit to turn with respect to the tube as the window is opened and closed.

* * * * *